United States Patent
Andre et al.

(10) Patent No.: US 11,890,659 B2
(45) Date of Patent: Feb. 6, 2024

(54) PRODUCTION OF METAL-BASED THIN FOILS

(71) Applicant: Bayerische Motoren Werke Aktiengesellschaft, Munich (DE)

(72) Inventors: Dave Andre, Munich (DE); Byron Konstantinos Antonopoulos, Munich (DE); Saskia Schneider, Munich (DE); Dennis Schuenemann, Mauern (DE); Barbara Stiaszny, Obergriesbach (DE); Sandra Zugmann, Garching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 480 days.

(21) Appl. No.: 16/406,266

(22) Filed: May 8, 2019

(65) Prior Publication Data

US 2019/0262878 A1    Aug. 29, 2019

Related U.S. Application Data

(63) Continuation of application No. PCT/EP2017/076142, filed on Oct. 13, 2017.

(30) Foreign Application Priority Data

Nov. 9, 2016   (DE) ............ 10 2016 222 004.7

(51) Int. Cl.
*B21B 1/40* (2006.01)
*B21C 23/00* (2006.01)
(Continued)

(52) U.S. Cl.
CPC .............. *B21B 1/40* (2013.01); *B21C 23/002* (2013.01); *B21C 23/06* (2013.01); *B21C 35/023* (2013.01);
(Continued)

(58) Field of Classification Search
CPC ....... B21C 23/06; B21C 29/00; B21C 29/003; B21B 1/40; B21B 2027/103; Y10T 29/30; Y10T 29/301
(Continued)

(56) References Cited

U.S. PATENT DOCUMENTS 3,000,109 A * 9/1961 Hill ............... B21B 45/0209
72/202
4,481,158 A * 11/1984 Georlette ............ B29D 7/00
264/435
(Continued)

FOREIGN PATENT DOCUMENTS

CN        1489520 A       4/2004
CN     101638760 A  *    2/2010
(Continued)

OTHER PUBLICATIONS

Helmenstine, Anne Marie, Ph.D. "How Cold Is Liquid Nitrogen?" ThoughtCo, Aug. 14, 2019, thoughtco.com/temperature-of-liquid-nitrogen-608592. (Year: 2019).*

(Continued)

*Primary Examiner* — Adam J Eiseman
*Assistant Examiner* — Jared O Brown
(74) *Attorney, Agent, or Firm* — Crowell & Moring LLP

(57) ABSTRACT

A method for producing metal-based thin foils is provided, which includes the steps of extruding a metal through an extruder to form a preliminary foil, cooling the preliminary foil in a coolant bath, and rolling the preliminary foil in a rolling system containing at least two rollers to form a metal-based thin foil.

3 Claims, 1 Drawing Sheet

(51) Int. Cl.

| | | |
|---|---|---|
| *B21C 23/06* | (2006.01) | |
| *B21C 35/02* | (2006.01) | |
| *H01M 4/04* | (2006.01) | |
| *H01M 4/40* | (2006.01) | |
| *H01M 10/04* | (2006.01) | |
| *C22F 1/16* | (2006.01) | |
| *H01M 4/38* | (2006.01) | |
| *H01M 10/00* | (2006.01) | |
| *H01M 10/0525* | (2010.01) | |

(52) U.S. Cl.
CPC ............. *C22F 1/16* (2013.01); *H01M 4/0435* (2013.01); *H01M 4/38* (2013.01); *H01M 4/405* (2013.01); *H01M 10/00* (2013.01); *H01M 10/04* (2013.01); *H01M 10/0525* (2013.01)

(58) Field of Classification Search
USPC .............................................. 29/17.1, 17, 2
See application file for complete search history.

(56) References Cited

U.S. PATENT DOCUMENTS

| | | | |
|---|---|---|---|
| 5,102,475 A | | 4/1992 | Raynaud et al. |
| 5,528,920 A | * | 6/1996 | Bouchard ............... H01M 4/04 72/205 |
| 2002/0114922 A1 | | 8/2002 | Bourne et al. |
| 2014/0196841 A1 | * | 7/2014 | Chiba ....................... C22C 9/00 428/606 |

FOREIGN PATENT DOCUMENTS

| | | | |
|---|---|---|---|
| CN | 101638760 A | | 2/2010 |
| CN | 101712050 A | | 5/2010 |
| CN | 102051509 A | * | 5/2011 |
| CN | 102051509 A | | 5/2011 |
| CN | 106001130 A | | 10/2016 |
| DE | 25 19 132 A1 | | 11/1975 |
| DE | 690 14 559 T2 | | 4/1995 |
| DE | 694 21 392 T2 | | 2/2000 |
| EP | 0 426 579 B1 | | 11/1994 |
| EP | 0 692 831 B1 | | 10/1999 |
| GB | 1 482 874 | | 8/1977 |
| JP | 48-37339 B | | 11/1973 |
| JP | 2007-119845 A | | 5/2007 |
| SU | 1103912 A | | 7/1984 |
| SU | 1103912 A1 | * | 7/1984 |

OTHER PUBLICATIONS

Chinese-language Office Action issued in Chinese Application No. 201780061090.7 dated Aug. 11, 2020 with English translation (12 pages).

Hull et al., "The deformation of lithium, sodium and potassium at low temperatures: Tensile and resistivity experiments", Philosophical Magazine, 1959, 4:39, 303-315, Taylor & Francis, 14 pages.

International Search Report (PCT/ISA/210) issued in PCT Application No. PCT/EP2017/076142 dated Dec. 6, 2017 with English translation (six (6) pages).

German-language Written Opinion (PCT/ISA/237) issued in PCT Application No. PCT/EP2017/076142 dated Dec. 6, 2017 (seven (7) pages).

German Search Report issued in counterpart German Application No. 10 2016 222 004.7 dated Aug. 7, 2017 with partial English translation (12) pages).

* cited by examiner

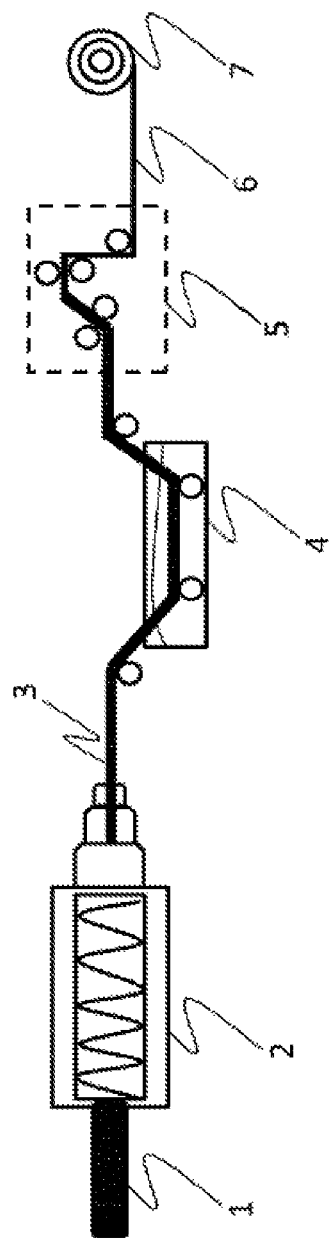

PRODUCTION OF METAL-BASED THIN FOILS

CROSS REFERENCE TO RELATED APPLICATIONS

This application is a continuation of PCT International Application No. PCT/EP2017/076142, filed Oct. 13, 2017, which claims priority under 35 U.S.C. § 119 from German Patent Application No. 10 2016 222 004.7, filed Nov. 9, 2016, the entire disclosures of which are herein expressly incorporated by reference.

BACKGROUND AND SUMMARY OF THE INVENTION

The invention relates to a process for the production of thin metal-based foils.

The prior art, see for example the document EP 0426579 B1, discloses a process for, by way of example, producing thin lithium foils with thicknesses below 200 μm. For this, it is proposed that lithium is rendered rollable at room temperature in the form of a lithium-magnesium alloy. This is necessary because the alkali metal lithium has not only very high reactivity in air containing moisture but also has high mechanical ductility at room temperature. This means that lithium has a strong tendency toward adhesion on a wide variety of materials.

The production of ultrathin layers of lithium of thickness 50 μm and below is addressed in the prior art not only in EP 0426579 B1 but also in the document EP 0692831 B1. Those documents propose providing a roll lubricant to the roll system so that the lithium foil can be taken off from the roll at an angle that allows the tensile stress in the foil during take-off to be below the elasticity limit of the foil.

The document EP 0426579 B1 also cites another process in which the rolling is to be achieved under inert gas by using cool hollow cylindrical rolls through which nitrogen flows.

It is an object of the invention to provide an improved process for the production of thin metal-based foils.

This and other objects of the invention are achieved by a process for the production of thin metal-based foils in accordance with one or more aspects of the disclosure.

The process of the invention includes the steps in which the metal is extruded in an extruder to form a preliminary foil, the preliminary foil is then cooled in a coolant bath, and the preliminary foil is rolled to form a thin foil by rolling in a rolling system having at least two rollers.

The steps as described must take place in succession in the stated sequence, but can be separated by other process steps. It is therefore possible by way of example that before a first cooling, without restriction of generality, the extruded foil is subjected to preliminary smoothing, or to cutting or to preliminary rolling. The intermediate product termed preliminary foil is obtained through extrusion of a metal ingot from which the actual foil is to be produced. The preliminary foil can also, if necessary, be subjected to a preliminary rolling process for initial thickness reduction. For cooling of the preliminary foil, this preliminary foil, with thickness ideally from 100 to 150 μm, is introduced into the coolant bath. The cooling significantly reduces the ductility of the material. However, cooling reduces ductility not only at the surface of the foil but also in particular in the center of the material. The cooled foil can then be rolled in a conventional rolling system and wound at a thickness from 5 to 80 μm.

The rolling and cooling steps can also be carried out a number of times in succession, i.e. repetitively.

In one embodiment of the invention, the coolant in the coolant bath is one of the following compounds or elements in liquid phase: nitrogen, ammonia, methane, hydrogen, oxygen, carbon dioxide, helium or another noble gas.

It is important here that the coolant and the preliminary foil are chemically stable or unreactive to one another. It is thus ensured that no irreversible alteration of the material of the preliminary foil takes place. Liquid noble gases such as liquid helium (He) are therefore proposed, or alternatively liquid-phase compounds having very high chemical stability such as nitrogen ($N_2$), ammonia ($NH_3$), methane ($CH_4$), hydrogen ($H_2$), oxygen ($O_2$) or carbon dioxide ($CO_2$).

The cooling time in the coolant bath varies as a function of the film thickness, preferably in the range of a few seconds in direct contact with, for example, liquid nitrogen.

The coolant bath can also be configured as a coolant container with a gaseous coolant, i.e., it is not restricted to a liquid coolant. The preliminary foil is thus passed either through the coolant bath or through the coolant container. This is ideally achieved by means of a roller system or conveyor system. The cooling alters the rolling properties of the material, because the material hardens. This in particular applies to alkali metals and alkaline earth metals, and alloys of these metals. Depending on the selected metal, a suitable temperature of the coolant bath and thus of the material leaving the coolant bath for rolling must be set. This suitable temperature is one that, in relation to the pressure exerted during rolling, brings the material as close as possible to the transition from ductility to brittleness. Rolling requires that the characteristic temperature of the transition from ductility to brittleness is slightly exceeded in the direction of ductility, in order that the preliminary foil does not break when it is then rolled. At the same time, the roll pressure must be below the level that would actually cause tearing of the slightly ductile foil during rolling, i.e., the roll pressure must be set below the tearing threshold of the foil, taking into account the temperature of the cooled foil.

The reduced ductility and, respectively, susceptibility to tearing at low temperatures also permits rapid rolling. High roll speeds can be achieved with rolls configured as conventional rolls of the prior art, e.g., made of polymer materials or of resins.

In another embodiment of the invention, the rolling system is also cooled with a coolant.

In particular, when rolling slowly, the rolls dissipate heat into the preliminary foil and heat the foil from the outside toward the inside, i.e., at an appropriately slow rolling speed the center of the preliminary foil is also slowly heated. This again leads to increased adhesion and susceptibility of the foil to tearing; this can be prevented by faster rolling and/or by active cooling of the rolls. It should be noted here that cooling of the rolls is not sufficient as sole measure for a good rolling result, i.e., without cooling of the preliminary foil, because rolling at room temperature by cooled rolls at the desired roll speeds only cools the surface of the preliminary foil, while the center of the preliminary foil retains sufficient ductility to render the foil highly susceptible to tearing when exposed to the pressure exerted by the rolls, despite cooled roll system, and the desired foil thicknesses below 50 μm are difficult to achieve in a reliable process. Cooling of the preliminary foil and simultaneously of the center of the preliminary foil is thus desired.

In a preferred embodiment of the process, the rolling system is cooled by liquid nitrogen. In an alternative to roll cooling, the preliminary foil to be rolled can be processed through a rolling system with a plurality of rolling steps where, between such rolling steps, the foil can be repeatedly cooled, i.e., repeatedly passed through a coolant bath. It is then possible, even in the case of slow rolling, to use a rolling system that is not cooled.

In another embodiment of the invention, the rolling system is cooled by the coolant which is also used as a coolant of the coolant bath. There is thus no requirement to provide a plurality of different types of coolant for the production process; this provides potential for cost saving.

If the rolled material reacts with the coolant at elevated temperature (e.g., room temperature), a suction-removal or cleaning process must be carried out before the temperature of the foil rises after rolling, in order to remove any possible adsorbed and/or physisorbed coolant from the rolled foil, before this can be wound. The evaporated coolant can be condensed again and if appropriate, purified and returned to the process. More costs can thus be saved.

In an embodiment of the invention, the thin metal-based foil is a foil based on an alkali metal or based on an alkaline earth metal or based on an alloy of alkali metals and/or of alkaline earth metals.

The basis for this is firstly that these metals or alloys have particularly high ductility, and the process is therefore particularly effective. Secondly, ultrathin foils of said metals (with foil thickness up to 5-50 μm) are of particular interest for certain applications, for example, for energy storage batteries. Thin lithium-based foils are, for example, of particular interest for lithium ion cells.

The invention is based on the considerations set out below:

Extruded lithium (Li), sodium (Na) or potassium (K), other extruded alkali metals and, respectively, alkaline earth metals, and alloys of these metals, have properties at moderate temperatures (about 270 K-310 K) that cause great difficulty in traditional processing with rolls. The materials are very ductile, i.e., soft, and are therefore susceptible to adhesion, thus requiring rolls of a particular type. Typical rolls consist, for example, of resins on which the metals adhere. A problem that moreover arises during processing of the materials to give thin foils (<100 μm) is that rolling often leads to tearing of the thin foils, because of the softness of the material, or leads to excessively inhomogeneous foil thickness or foil thickness tolerance; current rolling processes therefore impose limitations on foil thickness. However, some applications require foils with thickness <20 μm, i.e., at most one fifth of the foil thickness at which problems arise in prior-art production processes.

Another disadvantage is that the softness of the alkali metals requires a relatively low rolling speed. The additional requirement for use of specialized rolls also makes the rolls more expensive, and resultant costs are therefore significantly higher than for processing of widely used materials such as aluminum or copper. Even if these disadvantages are accepted, it is impossible to provide foil thicknesses of alkali metals and alkaline earth metals, and alloys of these metals, in the required foil thicknesses <20 μm in a reliable process.

The consequence of inability to realize required low foil thicknesses is that the user of the foils may have to use excess material resulting from excessively thick foils, or is unable to manufacture certain formats, or has to replace rolling with very complicated and expensive processes of other types—for example sputtering. This can have consequences in terms of cost, volume and weight.

It is therefore proposed that, after extrusion, the materials are cooled by passing through a bath consisting of liquid nitrogen between 63 K and 77 K, sublimed carbon dioxide (<195 K) or other liquid coolants, such as helium, ammonium, oxygen, any hydrogen isotope, noble gases or methane, in order to alter the rolling properties of the material. The material then passes through at least one rolling step where each of the rolls can, if necessary, likewise optionally be cooled (examples being rolls through which liquid nitrogen flows). Between the rolling steps, the material can again pass through a bath with a coolant.

In an alternative, it is also possible to cool the lithium directly through, for example, the conveyor belt or the rolls, or by using a gas flowing onto the material.

At very low temperatures, the materials are chemically stable or sufficiently unreactive toward the coolants, and which is why the cooling bath causes no irreversible alteration of the material or its properties. By cooling the materials in the cooling bath, the mechanical properties of the alkali metals or their alloys are significantly altered: the materials become harder (citation D. Hull & H. M. Rosenberg, Philosophical Magazine, 4 (1959) 303-315), and it is therefore necessary to use the most suitable rolling temperature for each material in order to keep the material as close as possible to the transition from ductility to brittleness—but above the characteristic temperature in the direction of increasing ductility.

The reduced ductility at low temperatures permits higher-speed rolling, while the rolls themselves can be configured as conventional rolls of the prior art. This therefore ensures that the surfaces are easy to produce, but have precision. As a result, the homogeneity of the foil thicknesses and foil properties is increased. In the case of very thin foils, the reduced ductility also leads to reduced tearing; the overall effect of this is that significantly thinner foils can be processed. This is of interest for various applications, e.g. collector material for electrodes in secondary batteries.

A preferred working example of the invention is described below with reference to the attached drawing. Further details, preferred embodiments and further developments of the invention are apparent therefrom.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a diagram of a process for the rolling of an ultra-thin lithium foil.

DETAILED DESCRIPTION

FIG. 1 shows a lithium ingot (1), which is extruded in a heated extruder (2). A preliminary foil (3) is thus obtained with thickness from 100 to 150 μm. This preliminary foil can be directly the extrudate of the extruder, or the extrudate of the extruder can be subjected to a preliminary rolling process for initial thickness reduction in order to achieve the thickness mentioned. The aim is to obtain, from the preliminary foil, an ultra-thin foil with final thickness from 5 to 80 μm. For this purpose, the preliminary foil is passed by means of rollers through a bath (4) with liquid nitrogen at a temperature of 77 K. The preliminary foil is then fed into a roll system (5) for rolling under the pressure exerted by the rollers to form a thin foil (6). The roll pressure and the roll speed here are selected in a manner such that the pressure exerted by the rolls at all times during rolling is not sufficiently high to break the cold foil. It is moreover necessary that at all times during rolling the foil is kept below its tear threshold by increasing the temperature of the center of the lithium foil during rolling and by controlling the pressure exerted by the rolls. The pressures that can be applied to the cold foil, or to the foil with temperature slowly increasing again in its center, are however sufficiently high to obtain a thin foil (6) with final thickness from 5 to 80 µm which has not broken and has not torn, and which can be wound by a winder (7). The precise pressures and roll speeds that can be applied must be determined empirically on the basis of the rolls used and their radii and surfaces.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for the production of thin metal-based foils, comprising the acts of:
    providing an extruder, a coolant bath, and a rolling system comprising at least two rollers;
    extruding a metal through the extruder to form a preliminary foil, wherein the preliminary foil has a thickness from 100 to 150 µm;
    cooling the preliminary foil in the coolant bath containing liquid nitrogen at a temperature between 63 K and 77 K; and
    then rolling the preliminary foil at least once in the rolling system comprising at least two rollers to form a thin metal-based foil with a thickness from 5 to 80 µm, wherein during rolling, the preliminary foil is kept below its tear threshold by increasing the temperature of the center of the foil,
    wherein the rolling system is cooled by the same coolant used in the coolant bath, and wherein the rolling system is not immersed in the coolant bath.

2. The process according to claim 1, wherein the thin metal-based foil is a foil selected from the group consisting of an alkali metal, an alkaline earth metal, an alloy of alkali metal and an alloy of alkaline earth metal.

3. The process according to claim 2, wherein the thin metal-based foil is a lithium-based foil.

* * * * *